Figure 1:
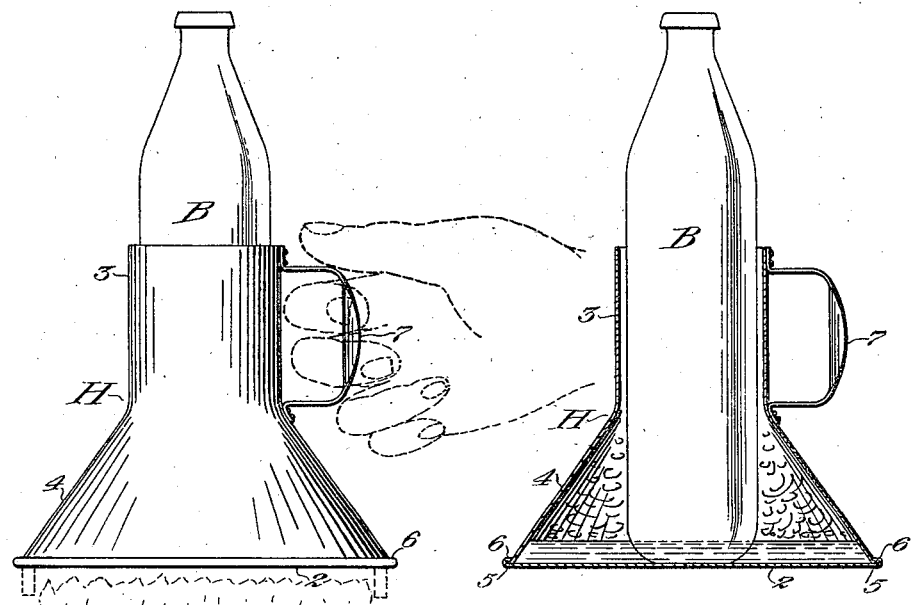

Feb. 26, 1924.           1,485,159
R. BARTHOLOMEW
HEATER OR LIKE UTENSIL
Filed April 19, 1920     2 Sheets-Sheet 1

Inventor:
Robert Bartholomew
By Arthur F. Amington
Attorney.

Feb. 26, 1924.           1,485,159
R. BARTHOLOMEW
HEATER OR LIKE UTENSIL
Filed April 19, 1920      2 Sheets-Sheet 2

Inventor:
Robert Bartholomew
By
Arthur R. Armington
Attorney.

Patented Feb. 26, 1924.

1,485,159

UNITED STATES PATENT OFFICE.

ROBERT BARTHOLOMEW OF BRIDGEPORT, CONNECTICUT.

HEATER OR LIKE UTENSIL.

Application filed April 19, 1920. Serial No. 374,865.

*To all whom it may concern:*

Be it known that I, ROBERT BARTHOLOMEW, a citizen of the United States, residing at Bridgeport, in the county of Fairfield, State of Connecticut, have invented certain new and useful Improvements in Heaters or like Utensils, of which the following is a specification.

This invention relates to an improved household utensil for heating milk and other foods over a flame or other source of heat.

One object of the invention is to provide a simple, inexpensive and relatively small and light vessel in which steam may be rapidly generated from a minimum quantity of water to cause it to quickly heat the contents of a food-container placed in the heater.

Another object of the invention is to provide a heater having an extended heating surface which will effect a rapid and efficient transmission of the heat from the burner or other source to the water in the heater.

Another object of the invention is to provide a heater in which the steam generated from the water will be deflected inwardly toward the food-container and confined within a restricted space around its walls.

Another object of the invention is to provide for the passage of the steam over the inner container at a relatively high velocity so as to maintain it at a high temperature with a maximum heating efficiency.

Another object of the invention is to provide a heater having its lower portion constructed as a separable unit which may be used as a sauce-pan or like utensil.

Figure 3:
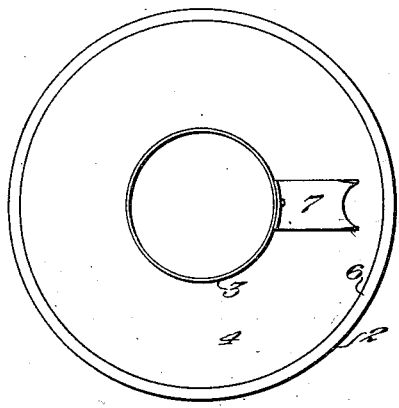
Figure 4:
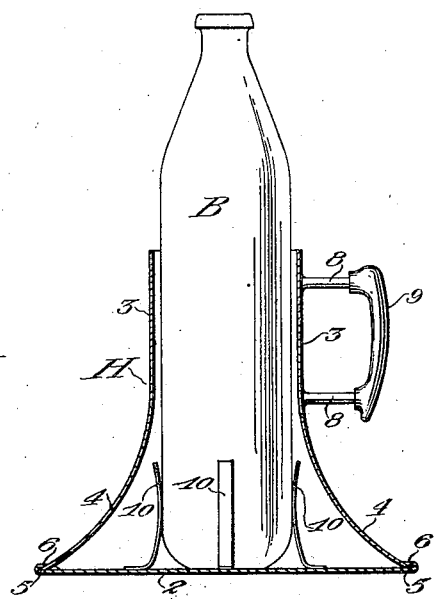
Figure 5:
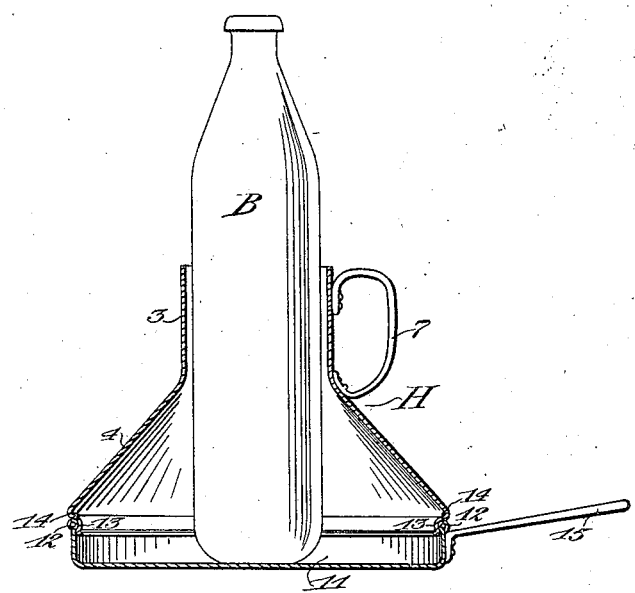
Figure 6:
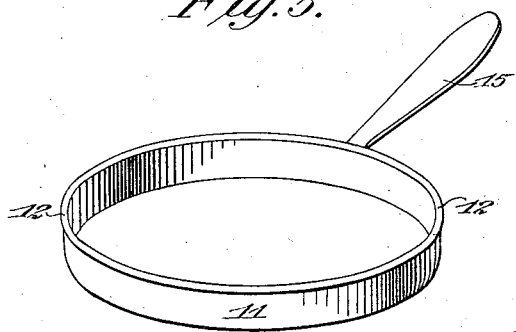

Further objects of the invention will appear from the detailed description of the device contained in the following specification which is illustrated by the accompanying drawings. In the drawings:

Fig. 1 is a side view of one form of my improved heater, showing it as used for heating a baby's bottle of conventional type, and illustrating the method of applying the device to a gas-stove burner or other source of heat;

Fig. 2, a vertical sectional view of the device, showing the manner in which the water is distributed over its extended bottom and the steam generated therefrom deflected inwardly around the sides of the bottle;

Fig. 3, a plan view of the device;

Fig. 4, a vertical sectional view of a modified form of my improved heater;

Fig. 5, a similar sectional view showing another embodiment of the invention in which the heater is made in two parts; and Fig. 6, a perspective view of the lower section of this embodiment of the device which is adapted for use as a sauce-pan or like utensil.

Referring to the drawings, my improved heater in its simplest form comprises essentially a small, light vessel H having an extended, flat bottom 2 surmounted by inwardly sloping sides 4 terminating in a constricted opening at the top. The body of the vessel or heater H may be constructed of aluminum, tin or any other suitable sheet metal, and its bottom 2 is preferably of sheet copper or some material having a high thermal conductivity. As illustrated in Figs. 1 and 2, the body portion of the heater H is made in one piece, being drawn up or spun into shape from a flat blank. If preferred however, it may be constructed in any other manner, for instance, by rolling a flat strip into the form shown and securing its edges together in a vertical seam. Referring particularly to Figs. 2 and 3, the upper body portion 3 of the heater is preferably of cylindrical form for substantially one-half the distance from top to bottom; while the walls of the lower body 4 are flared outwardly in substantially the shape of a truncated cone. The lower edge of the conical portion 4 is shown as turned outwardly in a narrow circumferential flange 5, and the flat, circular bottom 2 of the heater may be secured thereto by rolling its rim thereover or swedging it therearound as shown at 6 in Figs. 2 and 3.

To provide for convenient handling of the device, and for holding it over a burner or other source of heat, I attach a handle 7 to its side. The handle 7 may be formed of metal and riveted to the upper cylindrical wall 3, and I have found it preferable to insert a heat-insulating medium, not herein illustrated, between the handle and vessel. As shown in Fig. 2 of the drawings, the upper, cylindrical wall of the heater is made of suitable diameter to adapt it to enclose a baby's bottle B of usual type such as is generally used for milk and other liquid foods. If desired, however, the upper portion of the vessel H may be varied in shape and size to adapt it for other types of bottles or containers, such a modification in the form of the device falling within the scope of the present invention. It is to be understood, however, that the contracted upper neck 3 of the vessel H is designed to surround the sides of the bottle B or other container with only a slight space between the walls thereof, so that the steam arising from the water in the bottom of the heater will be closely confined around the bottle in the manner and for the purpose as hereinafter more fully explained.

In the modification of the device illustrated in Fig. 4, the lower walls of the body portion of the heater H are flared outwardly toward the bottom in substantially bell-shape. The sweeping curves on the sides of the heater give it a more graceful and pleasing appearance and this form of the device also has the advantage of adapting it to more convenient methods of manufacture by allowing the metal to be more readily spun out to the shape required. Fig. 4 also shows the heater H as provided with a more ornamental type of handle consisting of two parallel rods 8 riveted to its side and connected by a gracefully curved finger-hold 9. The finger-hold 9, or handle proper, may be constructed of vulcanized rubber, "bakelite", fibre, or any other suitable material of a non-conducting nature to prevent transmission of heat from the vessel to the user's hand. In this modified view of the heater I have also illustrated an arrangement of detent-means for retaining the bottle B in erect position in the vessel. The detent- or holding-device may comprise a plurality of curved spring-members 10 fastened to the bottom 2 of the vessel and projecting upwardly therefrom in position to grasp the sides of the bottle B. Such an arrangement of holding-means is of advantage for use with a bottle having a rounded or spherical bottom, but is not absolutely essential and may be dispensed with without detracting from the other advantages of my improved device.

In Fig. 5 I have illustrated a still further modification of the heater in which the vessel is constructed in two parts made separable to adapt one part for other uses. As here shown the bottom of the heater is made in the form of a shallow pan 11 having the upper edge of its sides curled over in a bead or rim 12. The upper portion of the heater may take the form shown in Figs. 1 and 2, or it may be shaped correspondingly to the modification shown in Fig. 4 of the drawings, and its lower edge inturned at 13 to provide an annular socket 14. The beaded rim 12 of the bottom portion or pan 11 is adapted to spring into the socketed rim 14 of the upper portion of the vessel to adapt it for use as a unitary heater; and the pan 11 may be released from the upper part or cover to allow it to be used separately as a spider or sauce-pan. For this purpose the pan 11 is provided with a handle 15 of any suitable type and construction.

My improved heater is applied to use in the manner as next explained: Referring to Fig. 1, a small quantity of water is first poured into the vessel H to cover its bottom to a slight depth, say one-quarter of an inch. The milk bottle B or other container is next set within the heater, resting on its bottom with the upper contracted portion 3 or neck of the vessel surrounding its sides with a relatively small space therebetween. The heater is then placed on a suitable stove, for instance over a gas-stove burner as illustrated by the dash-line in Fig. 1, or any other source of heat, such as electrical heating-coils, may be applied to its bottom. The heat from the flame or other source quickly heats the small amount of water distributed on the extended bottom of the heater and steam is generated practically instantaneously. As the steam rises from the water it is deflected inwardly by the tapering walls of the heated and confined closely about the sides of the bottle B. The steam finds its vent through the contracted mouth of the vessel and being confined to the restricted space between its walls 3 and the sides of the bottle it will therefore be caused to escape therethrough at a relatively high velocity. The effect of this is to cause a very efficient transmission of the heat throughout substantially the entire length of the bottle or other container without its exposure to the outer air. That is to say, the steam does not escape into the air until it has been passed along the greater part of the length of the bottle and hence condensation is retarded and loss of heating efficiency is prevented. It has been demonstrated that my improved heater will heat the contents of a baby's bottle to the proper temperature over a gas-burner in about two and one-half minutes. Besides having this increased efficiency my improved device also possesses other advantages, such, for instance, as being extremely simple in construction; economical to manufacture; and of small size and light in weight to provide for greater convenience in handling and storing.

In the modification of the invention shown in Fig. 4, the heater is of highly artistic design and when constructed in this form of aluminum or nickel-plated metal it will have a particular ornamental appearance. The means shown in this view for holding the bottle in place are not essential, but they serve to locate the bottle centrally of the neck 3 of the heater to provide for the complete circulation of the steam around its sides.

The modification illustrated in Fig. 5 of the drawings provides a separable unit 11 for use as a sauce-pan for heating solids, and hence adds to the utility of the device. When the heater has served its purpose for heating the baby's bottle, after the baby is weaned the upper part of the device may be stored and the bottom pan used as a convenient-sized sanitary utensil for heating or cooking solid food.

I believe I am the first to devise a heater of the type herein described wherein an extended heating surface is presented for heating the water, and in which the steam is directed inwardly around the food-container within a restricted area. I therefore wish to claim these features broadly without limitation as to the form and structure of the device which may be varied considerably without departing from the spirit of the invention.

What I claim is:

1. A heater for bottles and other food containers comprising a shallow pan-member of relatively large diameter surmounted by frusto-conical walls extending a considerable distance above the bottom of the pan to provide a steam dome for collecting the vapor arising from the water in the vessel, and a contracted cylindrical neck having parallel walls extending upwardly from the steam dome to a height to adapt them to enclose the upper portion of the bottle to confine the steam to a narrow space therearound whereby to cause it to be impelled through the contracted neck at high velocity due to the accumulated pressure in the steam dome.

2. A heater for bottles and other food containers consisting in a two-piece vessel comprising a shallow bottom pan-member of relatively large diameter, and a cover therefor adapted to fit over the pan-member and formed with frusto-conical walls extending a considerable distance above the bottom of the pan to provide a tapering steam dome for collecting the vapor arising from the water in the vessel, the walls of said steam dome merging into a contracted cylindrical neck having parallel walls for enclosing the sides of the bottle with a narrow space therebetween forming a contracted steam passage which acts to cause the vapor to be impelled along the sides of the bottle at high velocity due to the accumulated pressure in the steam dome.

3. A heater for bottles and other food containers comprising a shallow pan-member of relatively large diameter having a handle on its side and a beaded circular rim, and a separable cover adapted to fit around the rim of the pan-member and to be held in position thereby, said cover formed with inwardly sloping side walls extending a considerable distance above the pan-member to provide a frusto-conical steam dome for collecting the vapor arising from the water in the pan, the walls of said cover merging into a contracted cylindrical neck at the top having parallel sides extending upwardly to surround the upper portion of the bottle at a slight distance from the sides thereof whereby to provide a narrow steam passage through which the vapor is impelled at high velocity due to the accumulated pressure in the steam dome.

In testimony whereof I affix my signature.

ROBERT BARTHOLOMEW.